United States Patent [19]
Farr

[11] 3,900,084
[45] Aug. 19, 1975

[54] IMPROVEMENTS IN HYDRAULICALLY AND MECHANICALLY ACTUATABLE BRAKE SYSTEMS WITH AUTOMATIC ADJUSTERS

[75] Inventor: Glyn Phillip Reginald Farr, Leek Wootton, England

[73] Assignee: Girling Limited, Birmingham, England

[22] Filed: Feb. 25, 1974

[21] Appl. No.: 445,207

[30] Foreign Application Priority Data
Feb. 23, 1973  United Kingdom.................. 8868/73

[52] U.S. Cl. .............................. 188/196 F; 188/71.9
[51] Int. Cl. ........................................... F16d 65/56
[58] Field of Search ............ 188/71.9, 106 F, 106 P, 188/196 F, 196 D, 196 V, 196 BA

[56] References Cited
UNITED STATES PATENTS
| | | | |
|---|---|---|---|
| 3,365,031 | 1/1968 | Swift | 188/71.9 |
| 3,517,783 | 6/1970 | Belart | 188/196 BA |
| 3,550,732 | 12/1970 | Beller | 188/196 D |
| 3,747,711 | 7/1973 | Burnett | 188/71.9 |

*Primary Examiner*—Duane A. Reger
*Attorney, Agent, or Firm*—Scrivener Parker Scrivener and Clarke

[57] ABSTRACT

In a hydraulic actuator for a disc brake or the like, a reversible face cam serves the dual purpose of effecting relative rotation between two screw-threaded members of an automatic adjuster and of an auxiliary mechanical actuator for a handbrake.

To render the adjuster load insensitive the preferred embodiments have an auxiliary piston biassed by an auxiliary spring to prevent the reversible face cam from being effective when the hydraulic pressure exceeds a relatively low predetermined brake pressure at which caliper deflection is negligible.

22 Claims, 8 Drawing Figures

IMPROVEMENTS IN HYDRAULICALLY AND MECHANICALLY ACTUATABLE BRAKE SYSTEMS WITH AUTOMATIC ADJUSTERS

The present invention relates to automatic slack adjusters for vehicle braking systems having a main actuator, e.g. a footbrake-operated hydraulic actuator, and an auxiliary mechanical actuator, e.g. a handbrake.

In British Patent Specification No. 1,179,235 various slack adjusters are described and illustrated wherein a reversible face cam is utilised for effecting relative rotation at a non-reversible screw-thread connection when adjustment is required.

A reversible face cam comprises two members in axial interengagement through at least one helically inclined surface such that axial displacement of one member relative to the other causes rotation between said members and vice versa. On the other hand, a non-reversible screw-thread connection between two members is one in which an axial force applied to one member cannot normally cause relative rotation between the members. Whether a face cam or a screw-thread connection is reversible or not depends upon the helix angle of the cam or the pitch and flank angles of the screw-thread, and upon the coefficient of friction between the members. To effectively minimise the coefficient of friction in the case of a reversible face cam, the face cam preferably comprises a so-called "ball and ramp," the ball and ramp comprising two relatively rotatable and axially displaceable members, each having at least one groove therein whose base is helically inclined, a ball being arranged between the members and located partially in each corresponding groove. In practice, two or three equally circumferentially spaced balls are located in corresponding grooves.

Whilst references are made herein to the face cam having helically inclined surfaces, these surfaces need not be true helices; rather they could be straight but tangential to true helices. The term "helically inclined" as used herein is to be construed accordingly.

According to one aspect of the present invention, a reversible face cam serves both as the auxiliary mechanical actuator and as a means for effecting automatic adjustment at a screw-thread connection in the slack adjuster.

According to another aspect of the present invention, an actuator mechanism for a vehicle brake comprises a hydraulic actuator, an auxiliary mechanical actuator and an automatic slack adjuster operative between one of two components of the hydraulic actuator and the mechanical actuator which is fitted to the other hydraulic actuator component, the hydraulic actuator components being movable apart to apply an associated brake by fluid pressure applied between said components, wherein the mechanical actuator is in the form of a reversible face cam aligned with the hydraulic actuator axis and comprising first and second cam members having co-operative helically inclined surfaces thereon, said first cam member being part of said other hydraulic actuator component or being journalled in said other component, one of said cam members being turnable for mechanical actuation of the brake, and wherein said slack adjuster comprises a first non-rotatable adjuster member and a second rotatable adjuster member in screw-threaded engagement therewith, said first adjuster member being part of said one actuator component or being disposed to be axially abutted by said one actuator component, said second adjuster member being disposed to be abutted by said second cam member, means being provided to enable the latter to turn the second adjuster member in one direction when adjustment is required but not to turn the second adjuster member in the opposite direction.

Preferably, the last-mentioned means comprises a first spring torsionally operative between said cam members in a direction to urge the latter apart through the co-operative effect of the helical surfaces thereon and a second spring biassing the second cam member towards the first cam member and strong enough to overcome the first spring, the arrangement being such that, upon the occurrence of excess axial travel between the first cam member and the first adjuster member, the second adjuster member relieves the second cam member of the force of the second spring to enable the first spring to turn the second cam member.

The automatic adjuster can be rendered load-insensitive by arranging for an auxiliary piston axially biassed by a third or auxiliary spring to prevent the second cam member from being displaced from its resting position by the force of the first spring when the hydraulic pressure exceeds a predetermined relatively low value.

The invention will be further described, by way of example, with reference to the accompanying drawings, in which.

Figure 1:
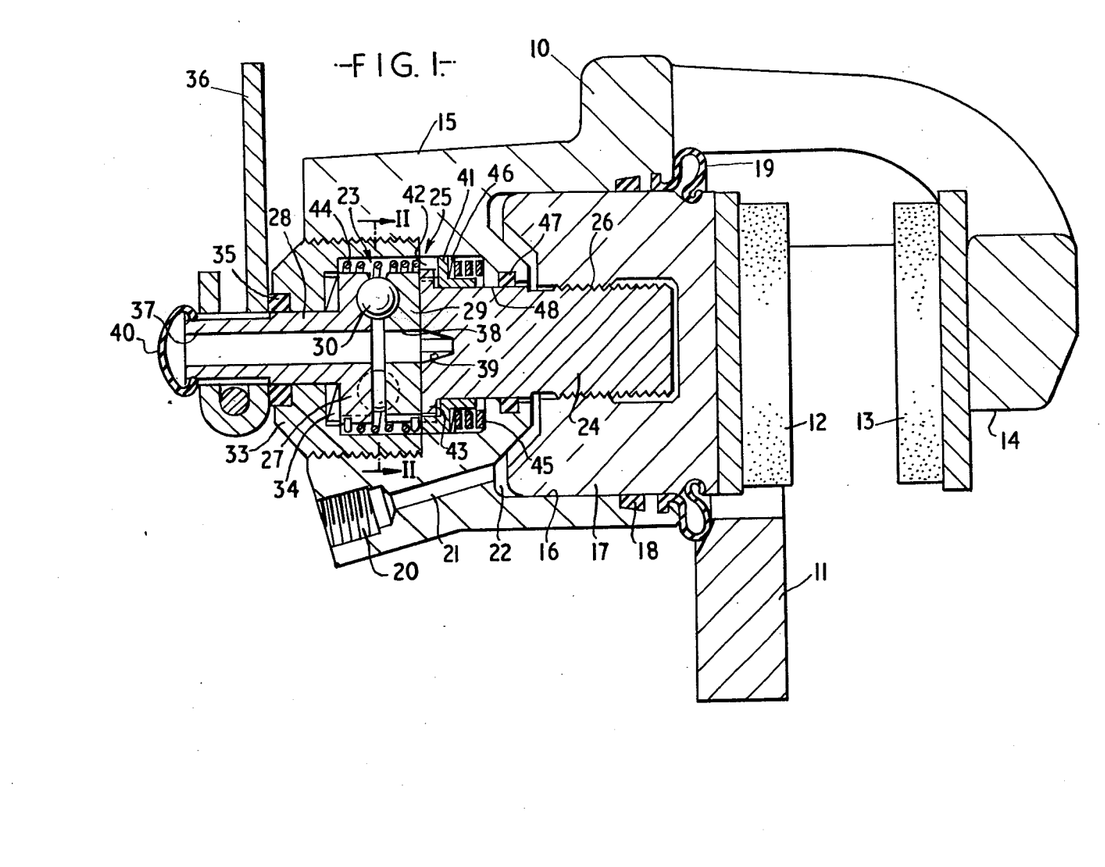
FIG. 1 is a sectional view of a spot-type disc brake fitted with an automatic slack adjuster in accordance with one embodiment of the invention.

Referring firstly to FIG. 1, a reaction-type spot-type disc brake comprises a sliding caliper 10 slidably mounted on a support 11 adapted to be fixed adjacent a brake disc (not shown) which extends between a directly operated pad assembly 12 and an indirectly operated pad assembly 13. The outboard limb 14 of the caliper 10 acts upon the indirectly operated pad assembly 13, whereas the inboard limb is formed integrally with an actuator cylinder body 15.

The body 15 contains a cylinder bore 16 in which a hydraulic actuator piston 17 is slidably arranged. The piston 17 acts on the directly operated pad assembly 12. The actuator piston 17 is sealed to the bore 16 by a sealing ring 18 and a flexible rubber boot 19 serves to prevent the ingress of dirt between the piston 17 and the bore 16. A connection port 20 leads via a passage 21 to the actuator chamber 22 at the inner end of the cylinder bore 16 for the purpose of applying hydraulic pressure to the actuator. Upon the application of such hydraulic pressure, the piston 17 is urged to the right to apply the brake pad assembly 12 and the caliper 10 is urged to the left to apply the indirectly operated pad assembly 13.

An auxiliary mechanical actuator is fitted to the cylinder actuator and comprises a reversible face cam 23 which acts between the actuator body 15 and a strut 24 which forms part of an automatic adjuster 25, and which is received in a blind bore in the piston 17 and is in screw-threaded engagement therewith by a non-reversible righthand screw-thread 26.

Figure 2:
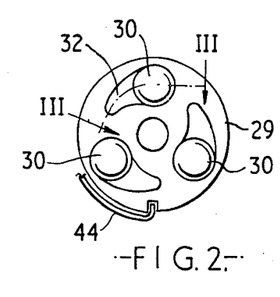
FIG. 2 is a detail view on the line II—II of FIG. 1.
Figure 3:
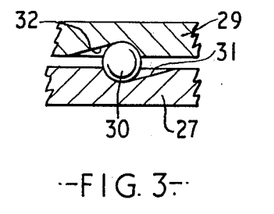
FIG. 3 is a developed sectional detail on the line III—III of FIG. 2.

The face cam 23 comprises a first cam disc 27 journalled by a spindle 28 in the cylinder body 15 and a second cam disc 29 cooperating with the strut 24 as described more fully hereinafter. To minimise rotational friction between the cam discs 27 and 29 three balls 30 are disposed between these discs and are received in corresponding grooves 31 and 32 as shown in FIGS. 2 and 3. The bases of the grooves 31 and 32 are helically inclined with a helix of the same hand as the screw-thread connection 26.

Whilst the grooves 31 and 32 are shown as having their bases in the form of true helices they could alternatively be straight grooves which approximate to true helices in view of their relatively short length.

The spindle 28 is journalled in a cap 33 screwed into the cylinder body 15, and thereby becoming effectively a part of the cylinder body. An anti-friction thrust bearing 34 is disposed between the rear face of the cam disc 27 and the inside wall of the cap 33. The spindle 28 extends outside the cap 33 and a sealing ring 35 surrounds the spindle to prevent ingress of dirt into the face cam and adjuster mechanisms. A lever 36 is non-relatively rotatably secured to the protruding end of the spindle 28 for external operation of the auxiliary mechanical actuator. The spindle 28 has a through bore 37 aligned with a central opening 38 in the cam disc 29 and providing therewith external access to a screw-driver socket 39 formed in the strut 24 for the purpose of resetting the adjuster as more fully described hereinafter. A rubber cap 40 normally closes the outside end of the bore 37.

The automatic adjuster 25 includes a collar 41 which encircles the strut 24. The collar 41 is provided with a number of circumferentially spaced axially extending fingers 42 which extend through peripheral slots in a flange 43 formed on the end of the strut 24 adjacent the cam disc 29. The strut 24 is thereby constrained to rotate when the collar 41 rotates, but the collar 41 is axially displaceable relatively to the strut.

A torsion spring 44 acts between the cam discs 27 and 29 tending to rotate the cam discs relative to one another in the direction which the grooves 32 urged the cam discs axially apart. Thus, the torsion spring 44 acts in a clockwise direction on the cam disc 29 as seen in FIG. 2. The cam disc 29 is thereby urged against the lefthand ends of the fingers 42 on the collar 41. A compression spring 45 supported by the cylinder body 15 acts through an anti-friction thrust bearing 46 on the collar 41, thereby urging the collar 41 to the left. The spring 46 is sufficiently strong to overcome the spring 44 so that the cam discs 27 and 29 are urged together in the resting position of the mechanisms until the balls 30 bottom in the grooves 31 and 32 as shown in FIGS. 2 and 3. The cam disc 29 abuts the lefthand end of the strut 24 for mechanical actuation but the axial dimension of the flange 43 is less than the length of the fingers 42 by the maximum desired amount of brake slack, e.g. twenty-thousandths of an inch. The resulting clearance is illustrated as being between the rear face of the flange 43 and the collar 41 and is exaggerated in the drawing. A sealing ring 47 seals the strut 24 to a reduced diameter bore 48 in the cylinder body 15.

During foot-pedal operation of the brake, the hydraulic pressure applied to the chamber 22 urges the piston 17 to the right which takes with it the strut 24. If adjustment is not required such movement is accommodated by the clearance between the flange 43 and the collar 41.

However, when brake lining wear has taken place the travel between the piston 17 and the cylinder body 15 upon hydraulic application of the brake is more than sufficient to take up the clearance between the flange 43 and the collar 41. The collar 41 is thereby urged to the right compressing the spring 45. This allows the spring 44 to turn the cam disc 29 since the cam disc 29 can follow the rightward movement of the collar 41. The collar 41, however, does not turn because it is constrained by the strut 24 which is itself prevented from turning under the axial load applied to the screw-thread connection 26. This axial load is developed by the hydraulic pressure which acts to the left on the strut 24, but is unable to move the strut 24 to the left because it acts on the piston 17 over a substantially larger area. When the foot pedal is released the hydraulic pressure in the chamber 22 is dissipated so that the screw-thread connection 26 is no longer loaded. The brake retraction forces now urge the piston 17 and the strut 24 to the left, thereby permitting the spring 45 to urge the collar 41 against the cam disc 29, and in turn moving the cam disc 29 towards the cam disc 27 against the force of the torsion spring 44. The cam disc 29 is thereby rotated in the opposite direction to the previous direction, i.e. anti-clockwise in FIG. 2, and because of the friction developed between the fingers 42 and the cam disc 29 under the force of the spring 45 the collar 41 and the strut 24 are also rotated, the strut 24 thereby being slightly unscrewed from the piston 17 in the absence of axial load at the screw-thread connection 26.

Upon hand-lever actuation of the brake, the lever 36 is turned anti-clockwise in FIG. 2 to turn the cam disc 27. So long as there is no load on the screw-thread connection 26, the strut 24 is also turned since the effect of the spring 45 is to urge the cam disc 29 to rotate with the cam disc 27. However, as soon as an axial load is developed at the screw-thread connection 26 the strut 24 is prevented from turning further and the friction developed between the cam disc 29 and the lefthand end of the strut 24 prevents the cam disc 29 also from being turned so that further anti-clockwise turning of the cam disc 27 urges the cam discs 27 and 29 apart. Upon release of the handbrake the opposite effect takes place, the strut 24 being ultimately screwed back into the piston 17 by approximately the same amount as it was previously unscrewed.

When the worn pad assemblies are replaced by new pad assemblies it is necessary to screw the strut 24 back into the piston 17. This can be readily effected by removing the cap 40 and inserting a screw-driver through the bore 37 and the opening 38 into the socket 39.

Figure 4:
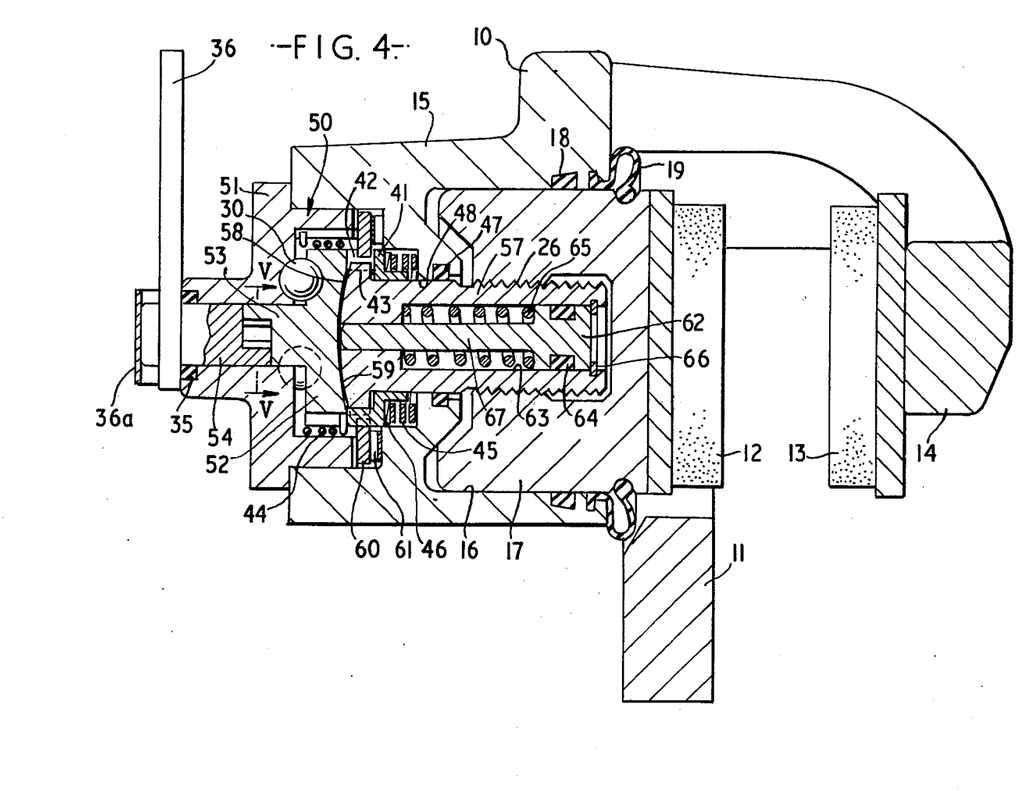
FIG. 4 is a sectional view similar to FIG. 1, but showing a second embodiment of automatic slack adjuster.
Figure 5:
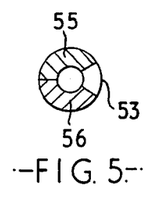
FIG. 5 is a detailed section on the line V—V of FIG. 4.

In the embodiment of FIGS. 4 and 5 parts like those of the embodiment of FIGS. 1 to 3 are denoted by like reference numerals and will not be described again. In the embodiment of FIG. 4 the reversible face cam 50 comprises a non-rotatable cam disc 51 which is formed as a cap attached to, and thereby effectively part of, the cylinder body 15, and a rotatable cam disc 52 journalled by a short spindle 53 in the cam disc 51. The arrangement of the three balls 30 and co-operating grooves with helically inclined bases is substantially as shown in FIGS. 2 and 3 previously described. The lever 36 is secured to a protruding end of a further spindle 54 also journalled in the cap formed by the disc 51. The spindles 53 and 54 have co-operating axial extensions 55 and 56 of segmental shape as shown in FIG. 5 of the drawings. The cam disc 52 is thereby permitted to rotate through an appreciable angle in a clockwise direction (FIG. 5) without movement of the lever 36 and corresponding rotation of the spindle 54. Screws (not shown) by which the cap 50 is attached to the cylinder body 15 also secure a retaining member 36a which serves to hold the spindle 54 and the lever 36 in place.

The strut 57 having the non-reversible righthand screw-thread connection 26 with the piston 17 has a slightly convex lefthand end face 58 which co-operates with a slightly concave rear face 59 of the cam disc 52. The radius of curvature of the concave face 59 is slightly greater than that of the convex face 58, so that contact between these two faces takes place close to the longitudinal axis of the actuators to minimise rotational friction between the cam disc 52 and the strut 57.

The fingers 42 on the collar 41 surrounding the strut 57 not only engage in axial notches in the flange 43 at the lefthand end of the strut, but also engage in notches in a washer 60 which is biassed by a spring 61 against the inner end of the cap formed by the non-rotatable cam disc 51.

A further optional feature is illustrated in FIG. 4, whereby the adjuster is rendered load-insensitive. This feature is the provision of an auxiliary piston 62 slidable inside a bore 63 within the strut 57 and sealed thereto by a sealing ring 64. A coil spring 65 biasses the piston 62 to the right relative to the strut 57 but is held captive by a spring ring 66 fitted in the righthand end of the bore 63. The piston 62 is formed integrally with a piston rod 67 whose free end is disposed to co-operate with the cam disc 52.

Inasmuch as the auxiliary piston 62 and its associated parts are optional, the operation of the brake of FIGS. 4 and 5 will first of all be described as if these parts were absent and the strut 57 were simply a solid strut not unlike the strut 24 of FIG. 1, but with the convex end face 58. Let it be supposed that the brake of FIGS. 4 and 5 is applied hydraulically when pad wear has taken place necessitating automatic adjustment. The clearance between the flange 43 and the collar 41 is taken up as the piston 17 moves to the right and the spring 45 is compressed, thereby permitting the torsion spring 44 to turn the cam disc 52 clockwise (FIG. 5). The strut 57, however, is prevented from turning by the friction developed at the screw-thread connection 26 which is axially loaded as previously described with reference to FIG. 1. When the hydraulic pressure is released, the retraction of the piston 17 permits the spring 45 to urge the cam disc 52 against the cam disc 51, thereby turning the cam disc 52 in an anti-clockwise direction (FIG. 5) and likewise turning the strut 57 as described previously with reference to FIG. 1. It will be noted that the clearance between the segmental extensions 55 and 56 permits the above described rotational movement of the cam disc 52. The automatic adjustment of the embodiment of FIG. 4 is otherwise substantially the same as that described in FIG. 1.

The hand-lever operation of the embodiment of FIG. 4 is, however, rather different from that of FIG. 1. In contrast to FIG. 1 the mechanical actuation is effected by clockwise rotation (FIG. 5) of the lever 36. This immediately turns the cam disc 52 urging the strut 57 to the right relative to the cylinder body 15. In this case there is relatively low frictional torque between the cam disc 52 and the strut 57 and turning of the strut 57 is resisted by the washer 60 which is frictionally held by the spring 61. The friction so developed is sufficient to prevent the strut 57 from being turned by the cam disc 52 upon mechanical actuation, but is insufficient to impede the previously described automatic adjustment.

Reference has been made in the description of FIGS. 1 and 4 of the drawings to "brake retraction forces." These are the forces produced as a result of the deformation of the various parts of the brake, and in particular deformation of the caliper 10 when the brake is applied. Since this deformation will depend upon the applied brake pressure, the piston travel will be the greater, the greater is the applied hydraulic pressure. It follows that the total piston travel when the brake is applied is dependent not only on the desired working clearance when the brake is released, but also upon the force with which the brake is applied. There is, therefore, the risk of over-adjustment taking place due to heavy brake application. In other words, the adjuster is load-sensitive.

In the embodiment of FIG. 4, the piston 62 and spring 65 are provided to render the adjuster load-insensitive. The spring 65 is so dimensioned in relation to the diameter of the auxiliary piston 62 that the hydraulic pressure acting to the left on the piston 62 can overcome the spring 65 at a relatively low brake pressure, such as 50 psi. Inasmuch as pad wear takes place when the brake is applied, the operation of the adjuster of FIG. 4 will now be considered, taking into account the auxiliary piston 62. When the brake of FIG. 4 is applied the piston 17 is in a position to the right of that illustrated wherein the spring 45 is compressed to an extent dependent upon the brake deflection. Since the hydraulic pressure is high relative to the value required to overcome the spring 65 the auxiliary piston 62 is urged to the left to press the cam disc 52 into its illustrated resting position with the balls 30 bottoming in their grooves. Under such conditions, the ends of the fingers 42 are separated from the cam disc 52.

As pad wear takes place the piston 17 moves slightly further to the right taking with it the collar 41, whereby the rightward movement of the collar 41 against the spring 45 is more than that required to accommodate the brake deflection. As the brake is released the piston 17 is moved to the left by the brake retraction forces by an amount commensurate with the previous brake deflection, but this amount is insufficient to bring the strut 57 back to its previous position because of the extra rightward travel which took place upon pad wear. When the hydraulic pressure falls to the above-mentioned predetermined value, the pressure acting on the piston 17 is still sufficient to keep the spring 45 slightly compressed but becomes no longer able to overcome the spring 65. The piston 62 is thereby retracted to its illustrated position permitting the torsion spring 44 to turn the cam disc 52 and so advance the cam disc 52 against the strut 57. Upon complete dissipation of the brake pressure the spring 45 urges the collar 41 fully back to its resting position in which it presses the cam disc 52 back to the left so that the balls 30 bottom in their grooves, thereby turning the cam disc 52 which consequently turns the collar 41 against the friction developed at the washer 60 by the spring 61. The strut 57 is likewise turned to effect the adjustment.

Thus, in the embodiment of FIG. 4 as illustrated, the adjustment cycle takes place at brake pressures between zero and the relatively low predetermined value at which the caliper deflection is negligible whereby caliper deflection resulting from higher brake pressures has no adverse effect on the adjustment operation.

Since the balls 30 ride on two helices, i.e. the bottoms of the grooves 31 and 32, the effective helix angle of the face cam 23 or 50 is to a first approximation equal to twice the helix angle of each of the individual grooves 31 and 32. The pitch angle of the screw-thread connection 26 is preferably not greater than the effective resultant helix angle of the face cam 23 or 50. If the two angles are equal the adjuster is a so-called "one shot" adjuster, i.e. the total adjustment required to compensate for lining wear takes place during a single adjustment cycle. If the pitch angle of the screw-thread connection 26 is smaller than the effective helix angle of the face cam 23 or 50 the adjuster is of the so-called "incremental type" i.e. the adjustment in one adjustment cycle will be somewhat less than is needed to compensate for lining wear, but further adjustment can take place during the next adjustment cycle even if no further wear has taken place. In particular, in the embodiment of FIG. 4 the adjustment cycle takes place upon brake application as well as upon brake release, but naturally no lining wear takes place while the brake is released. If lining wear has taken place during a previous braking operation, and the adjuster is an incremental type adjuster, the adjustment cycle taking place upon brake release does not take up the whole of the lining wear and a further take up is effected when the brake is next applied.

It should be noted that in the case wherein the adjuster is of the incremental type, i.e. where the pitch angle of the screw-thread connection 26 is less than the helix angle of the face cam 23 or 50, it is necessary to make the spring 45 sufficiently strong to act as a brake return spring.

In the embodiment of FIG. 1, the screw-driver socket 39 in the strut 24 is accessible for resetting the adjuster. No such access is available in the embodiment of FIG. 4 and for resetting the adjuster of FIG. 4 it is necessary to be able to turn the piston 17, this piston being normally non-rotatable.

The embodiment of FIG. 1 may be rendered load-insensitive in the same way as the embodiment of FIG. 4. The cam disc 29 of FIG. 1 would then not be provided with the opening 38 and the strut 24 would contain an auxiliary piston like the piston 62 and a spring like the spring 65 of FIG. 4, and the piston rod would extend so as to be able to abut the cam disc 29 like the piston rod 67.

Figure 6:
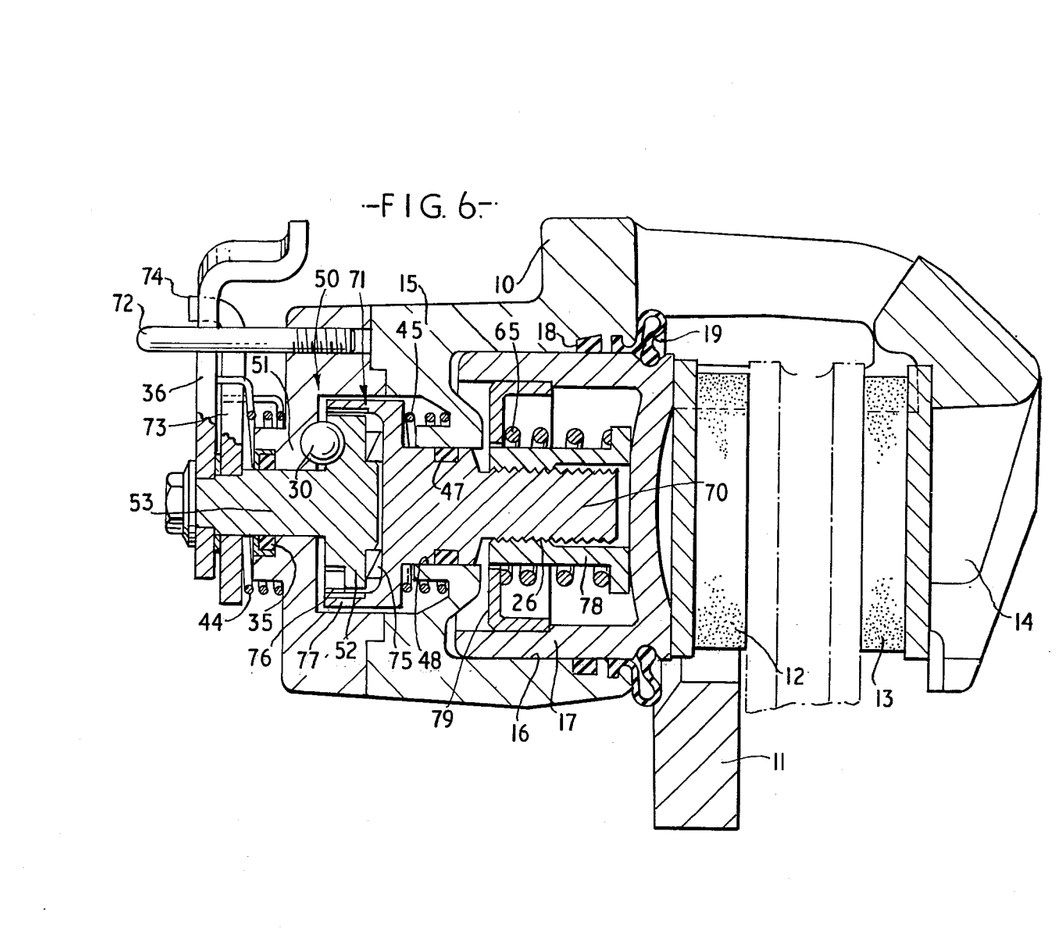
FIG. 6 is a sectional view similar to FIGS. 1 and 4, but showing a third embodiment of automatic slack adjuster in accordance with the invention.

In the embodiment of the invention shown in FIG. 6 of the drawings, the strut 70 itself serves as an auxiliary piston for rendering the adjuster load-insensitive. The adjuster mechanism 71 shown in FIG. 6 also differs in a number of respects from that of the preceding Figures. In FIG. 6 parts like those of FIGS. 4 and 5 are denoted by like reference numerals. The spindle 53 journals the cam disc 52 in the non-rotatable cam disc 51 which is formed as a cap attached by screws (not shown) to, and thereby effectively part of, the cylinder body 15. The handbrake lever 36 is in this case freely journalled to the protruding end of the spindle 53 and is urged against the stop pin 72 by a second lever 73 which is keyed to the spindle 53. The second lever 73 has a turned-out projection 74 at a suitable position to engage the lever 36. The torsion spring 44 in this embodiment acts between the levers 36 and 73 and may be constructed as a hairpin spring having several convolutions. Looking from the left in FIG. 6, the torsion spring 44 acts clockwise on the handbrake lever 36 and anticlockwise on the second lever 73. In this embodiment the helices of the reversible face cam 50 are lefthand helices. The cam disc 52 acts on the lefthand end of the strut 70 through a thrust bearing 75. A one-way clutch mechanism 76 is operative between an annular flange 77 on the lefthand end of the strut 70 and the outer periphery of the cam disc 52. This one-way clutch mechanism is operative to turn the strut 70 in a clockwise direction (as seen from the left in FIG. 6) when the cam disc 52 is turned clockwise. In the illustrated embodiment the one-way clutch mechanism 76 is in the form of a ratchet mechanism in which the pawl is mounted on the cam disc 52 and the ratchet teeth are formed internally in the annular flange 77. The one-way clutch mechanism 76 permits relative axial displacement between the cam disc 52 and the strut 70.

The strut 70, which is sealed by the sealing ring 47 to the reduced diameter bore 48 so as to act as an auxiliary piston, has a lefthand screw-thread connection 26 with a nut 78. The nut is biased against the base wall of the piston 17, which in this embodiment is a hollow piston, by the auxiliary spring 65. The auxiliary spring 65 acts between an out-turned flange on the nut 78 and an abutment ring 79 firmly secured in the piston 17. There is a keyed connection (not shown) between the abutment ring 79 and the nut 78 to prevent the nut 78 from turning relative to the piston 17 which is itself normally prevented from turning.

In the normal resting position of the brake illustrated in FIG. 6, the spring 45 acting to the left on the strut 70 urges the cam disc 52 towards the fixed cam disc 51 against the force of the torsion spring 44 until the turned-out projection 74 engages the lever 36, which is itself already in engagement with the stop pin 72. In this case the balls 30 do not bottom in their grooves but should be close to the deep ends of the grooves in order that the maximum cam travel can be utilised.

Inasmuch as the load-insensitive feature of the embodiment shown in FIG. 6 is optional, the operation of this embodiment will be first described as if the strut 70 were screwed directly into the piston 17 by the screw-thread connection 26 in the same way as in the embodiment of FIG. 1. During normal hydraulic operation of the brake, the strut 70 moves to the right with the piston 17 against the force of the spring 45. This allows the torsion spring 44 to turn the cam disc 52 in an anticlockwise direction (as seen from the left in FIG. 6). The pitch of the ratchet teeth of the one-way clutch mechanism 76 is such that within the limits of the normal brake slack travel the pawl does not step onto the next ratchet tooth, so that when the brake is released again the spring 45 returns the cam disc 52 to its illustrated resting position against the force of the torsion spring 44 without the one-way clutch mechanism 76 turning the strut 70. Should some lining wear take place while the brake is applied, the strut 70 is pulled so far to the right by the piston 17 that the cam disc 52 can turn far enough to step the one-way clutch mechanism 76 onto the next ratchet tooth. When the brake is released the spring 45 returns the cam disc 52 to the left, thereby turning the cam disc in a clockwise direction (as seen from the left in FIG. 6) and the stepped one-way clutch mechanism 76 also turns the strut 70 in the same direction to unscrew it slightly from the piston 17 and so compensate for the lining wear.

The adjuster shown in FIG. 6 is rendered load-insensitive by the action of the spring 65 as in the embodiment of FIG. 4. The brake pressure is applied to the left to the strut 70 and this overcomes the spring 65 at a relatively low brake pressure. At higher brake pressures the strut 70 is held to the left and cannot follow movements of the piston 17. If it is assumed that during brake application some lining wear has taken place, then as the brake pressure is reduced to the relatively low value at which the spring 65 can no longer be overcome, the strut 70 is pulled to the right by the spring 65, which is stronger than the spring 45. This enables the cam disc 52 to follow to the right and to be turned by the torsion spring 44. When the brake is finally released the spring 45 urges the strut 70 again to the left, so that the cam disc 52 unscrews the strut 70 via the one-way clutch mechanism 76 as described above.

Upon handbrake operation the lever 36 is turned anti-clockwise (as seen from the left in FIG. 6) away from the stop pin 72 taking with it the second lever 73, and thereby turning the cam disc 52. This urges the strut 70 to the right to apply the brake, the strut 70 being prevented from turning due to friction developed at the screw-thread connection 26 under the brake applying force. Normally, the turning movement of the cam disc 52 will be insufficient to step the one-way clutch mechanism 76 so that upon release of the handbrake the spring 45 can return the cam disc 52 to its illustrated resting position without the cam disc turning the strut 70.

It will be noted that in the embodiment of FIG. 6 the brake pressure is applied to the whole of the area of the piston 17 and the brake applying force is the force developed by this pressure, less the force of the spring 65 which is overcome at relatively low brake pressures. This is an improvement on the brake shown in FIG. 4 wherein the brake applying force is that due to the pressure acting over the area of the piston 17, less the force due to the pressure acting over the cross-sectional area of the strut 57.

In a non-illustrated modification of the embodiment shown in FIG. 6, the lever 36 is keyed to the spindle 53 and the lever 74 is omitted. In this case the torsion spring 44 acts between the lever 36 and the fixed cam disc 51. A brake cable passes through an aperture in the free end of the brake lever 36 so that during hydraulic operation the lever 36 can turn. In the resting position the free end of the lever rests against a nipple secured to the end of the brake cable and presses the nipple against a suitable stop. When the handbrake is applied the cable is drawn to pull the nipple away from its stop against the force of a handbrake retraction spring and the nipple engages the end of the brake lever to apply the brake as described above.

The embodiments of FIGS. 1 and 4 can be made load-insensitive in the same way as the embodiment shown in FIG. 6, i.e. by dispensing with the auxiliary piston and by arranging for the strut to be screwed into a non-rotatable nut which is axially biased against the actuator piston by an auxiliary spring.

Figure 7:
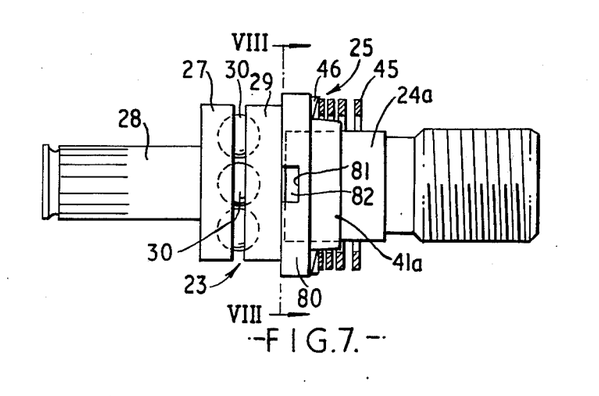
FIG. 7 is a side elevation of the mechanical actuator and a modified slack adjuster appertaining to the brake of FIG. 1.
Figure 8:
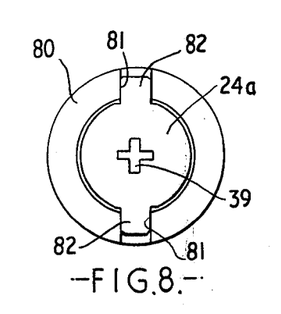
FIG. 8 is a view on the line VIII—VIII of FIG. 7.

FIGS. 7 and 8 of the drawings illustrate the mechanical actuator of FIG. 1 and a small modification to the automatic slack adjuster 25a. In FIGS. 7 and 8, the collar 41a has a flange 80 whose end face is provided with diametrically opposed grooves 81 and the lefthand end (FIG. 7) of the strut 24a is provided with diametrically opposed radial projections 82 which are received in the grooves 81 to couple the strut 24a and the collar 41a so that they rotate together whilst permitting some relative axial displacement. The strut 24a is shown in FIG. 7 in a position in which clearance is present between the end of the strut 24a and the cam disc 29.

Whilst the invention has been illustrated as applied to a sliding caliper reaction-type disc brake in which the actuator is housed in the caliper, the invention is applicable to many other types of brakes and hydraulic actuators. For example, the body member housing the actuator may be fixed and may slidably support the caliper. In such an arrangement the actuator has two opposed pistons, one of which acts on the directly operated pad and the other of which houses the face cam and acts upon the caliper. Also, in the case of a so-called "swinging caliper-type" disc brake the caliper is mounted for pivotal movement rather than slidably mounted.

I claim:

1. An actuator mechanism for a vehicle brake comprising in combination, a hydraulic actuator having actuator components being movable apart to apply an associated brake by fluid pressure applied between said components, an auxiliary mechanical actuator and an automatic slack adjuster which is operative between one of said components of the hydraulic actuator and said mechanical actuator, wherein said mechanical actuator comprises a reversible face cam aligned with the hydraulic actuator axis and comprising first and second cam members having co-operative helically inclined surfaces thereon, said first cam member being axially fixed relative to said other hydraulic actuator component, one of said cam members being turnable for mechanical actuation of the brake, and wherein said slack adjuster comprises a first non-rotatable adjuster member and a second rotatable adjuster member in screw-threaded engagement therewith, said first adjuster member being associated with said one actuator component, said second adjuster member being disposed to be axially abutted by said second cam member, means being provided to enable the latter to turn the second adjuster member in one direction upon hydraulic operation when adjustment is required but not to turn the second adjuster member in the opposite direction.

2. An adjuster mechanism according to claim 1 in which said face cam further comprises rolling members between said co-operative helically inclined surfaces on said first and second cam members.

3. An adjuster mechanism according to claim 1 in which the last mentioned means comprises a first spring torsionally operative between said cam members in a direction to urge the latter apart through the co-operative effect of said helical surfaces thereon and a second spring biassing the second cam member towards the first cam member and strong enough to overcome the first spring such that, upon the occurrence of excess axial travel between the first cam member and the first adjuster member, the second adjuster member relieves the second cam member of the force of the second spring to enable the first spring to turn the second cam member.

4. An actuator mechanism according to claim 3 in which said slack adjuster further comprises an intermediate member relatively axially displaceably but non-relatively rotatably keyed to said second adjuster member, said second spring acting on said second cam member via said intermediate member, said second adjuster member axially abutting said intermediate member to relieve the second cam member of the force of the second spring upon the occurrence of said excess axial travel.

5. An actuator mechanism according to claim 4 in which said intermediate member comprises a collar which encircles said second adjuster member.

6. An actuator mechanism according to claim 3 in which said second spring acts on said second cam member via said second adjuster member and in which said slack adjuster further comprises a one-way ratchet type rotary clutch arranged between the second cam member and the second adjuster member, the ratchet type clutch being stepped upon the occurrence of said excess axial travel.

7. An actuator mechanism according to claim 1 in which said first cam member is journalled for rotation in said other hydraulic actuator component and is the one turnable for mechanical actuation of the brake.

8. An actuator mechanism according to claim 1 in which said first cam member is non-rotatable and is effectively part of said other hydraulic actuator component and said second cam member is the one turnable for mechanical actuation of the brake, and in which a lost motion connection is provided and is associated with the mechanical actuator to enable the second cam member to turn when adjustment is required.

9. An actuator mechanism according to claim 8 in which a lever is provided coaxial with the reversible face cam and the lost motion connection is provided between the lever and the second cam member.

10. An actuator mechanism according to claim 9 which further comprises first and second coaxial spindles and in which the lever is secured to said first spindle and said second spindle is provided on and journals the second cam member said lost motion connection being provided between said first and second spindles.

11. An actuator mechanism according to claim 9 which further comprises a spindle provided on and journalling the second face cam member, said lever being rotatably mounted on said spindle, and a second lever secured to said spindle and engageable by the first mentioned lever so that the lost motion connection is between said two levers.

12. An actuator mechanism according to claim 8 which further comprises a spindle provided on and journalling the second face cam member and a lever secured to said spindle and having a free end, and a brake applying member, said lost motion connection being between said free end and said brake applying member.

13. An actuator mechanism according to claim 1 in which said second adjuster member comprises a strut having an external screw thread mating with an internal screw thread in said first adjuster member.

14. An actuator mechanism according to claim 1 in which said second adjuster member is slidably sealed to the said other actuator component and has an effective cross sectional area less than that of the hydraulic actuator, whereby the screw thread connection between the first and second adjuster members is loaded by the hydraulic pressure to prevent said second adjuster member from turning in said opposite direction when the brake is applied hydraulically.

15. An actuator mechanism according to claim 1 in which said first adjuster member effectively comprises part of said one actuator component.

16. An actuator mechanism according to claim 1 in which the slack adjuster further comprises an auxiliary piston and an auxiliary spring axially biassing said auxiliary piston to prevent the second cam member from being displaced from its resting position when the hydraulic pressure exceeds a predetermined relatively low value.

17. An actuator mechanism according to claim 1 in which the slack adjuster further comprises an auxiliary piston displaceably mounted in said second adjuster member for movement by the hydraulic pressure against the second cam member to hold the latter in its resting position and an auxiliary spring biassing the auxiliary piston against the hydraulic pressure to prevent the auxiliary piston from holding the second cam member in its resting position so long as the hydraulic pressure is below a predetermined relatively low value at which it can overcome the auxiliary spring.

18. An actuator mechanism according to claim 14 in which said first adjuster member is separate from said one actuator component and acts as an auxiliary piston to hold the second cam member in its resting position and in which the slack adjuster further comprises an auxiliary spring biassing said first adjuster member against said one actuator component to prevent the first adjuster member from holding the second cam member in its resting position so long as the hydraulic pressure is below a predetermined relatively low value at which it can overcome the auxiliary spring.

19. An actuator mechanism according to claim 1 in which said one actuator component comprises a piston.

20. An actuator mechanism according to claim 19 in which said other actuator component comprises a cylinder body having a cylinder bore in which said actuator piston is slidable.

21. An actuator mechanism according to claim 20 in which said cylinder body is constructed as a caliper of a reaction type, spot type disc brake.

22. In a hydraulic brake actuator for a vehicle brake system: reversible face cam means; manual means for producing rotation at said reversible face cam means to produce axial thrust for auxiliary mechanical actuation of the brake system; a slack adjuster mechanism having a screw-thread connection therein, said axial thrust being applied via said slack adjuster mechanism; resilient means operative upon said reversible face cam means to produce rotation thereat upon hydraulic actuation of the brake system; and means for transmitting the last-mentioned rotation to said screw thread connection when the travel of the brake system upon hydraulic actuation thereof exceeds a predetermined value.

* * * * *